Figure 1:
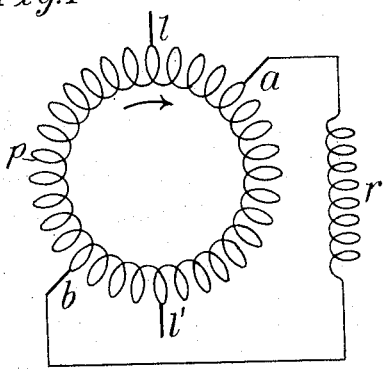

No. 852,027. PATENTED APR. 30, 1907.
R. D. MERSHON.
ALTERNATING CURRENT MACHINE ON SINGLE PHASE CIRCUIT.
APPLICATION FILED SEPT. 29, 1904.

3 SHEETS—SHEET 1.

Witnesses:
Thos. J. Byrnes
D. S. Dunham

R. D. Mershon Inventor
by Kerr, Page & Cooper Attys.

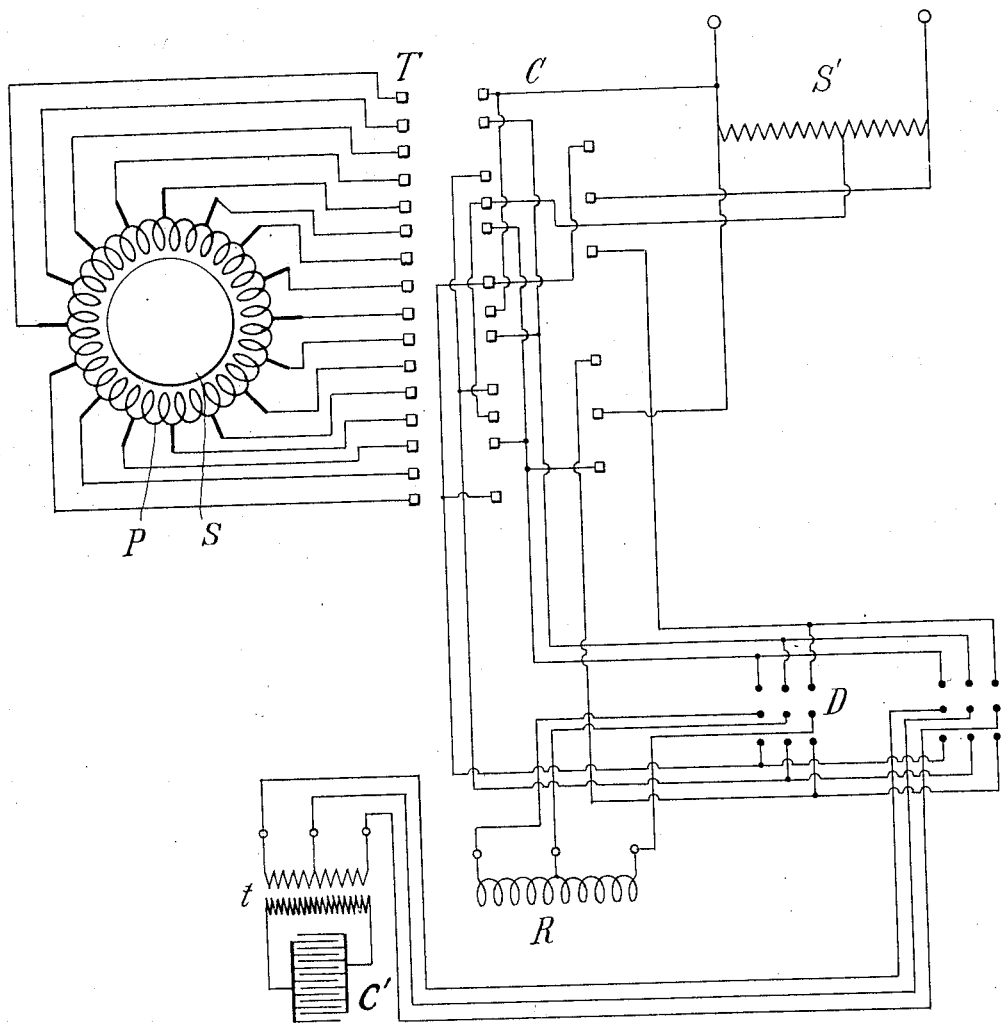

No. 852,027. PATENTED APR. 30, 1907.
R. D. MERSHON.
ALTERNATING CURRENT MACHINE ON SINGLE PHASE CIRCUIT.
APPLICATION FILED SEPT. 29, 1904.
3 SHEETS—SHEET 3.
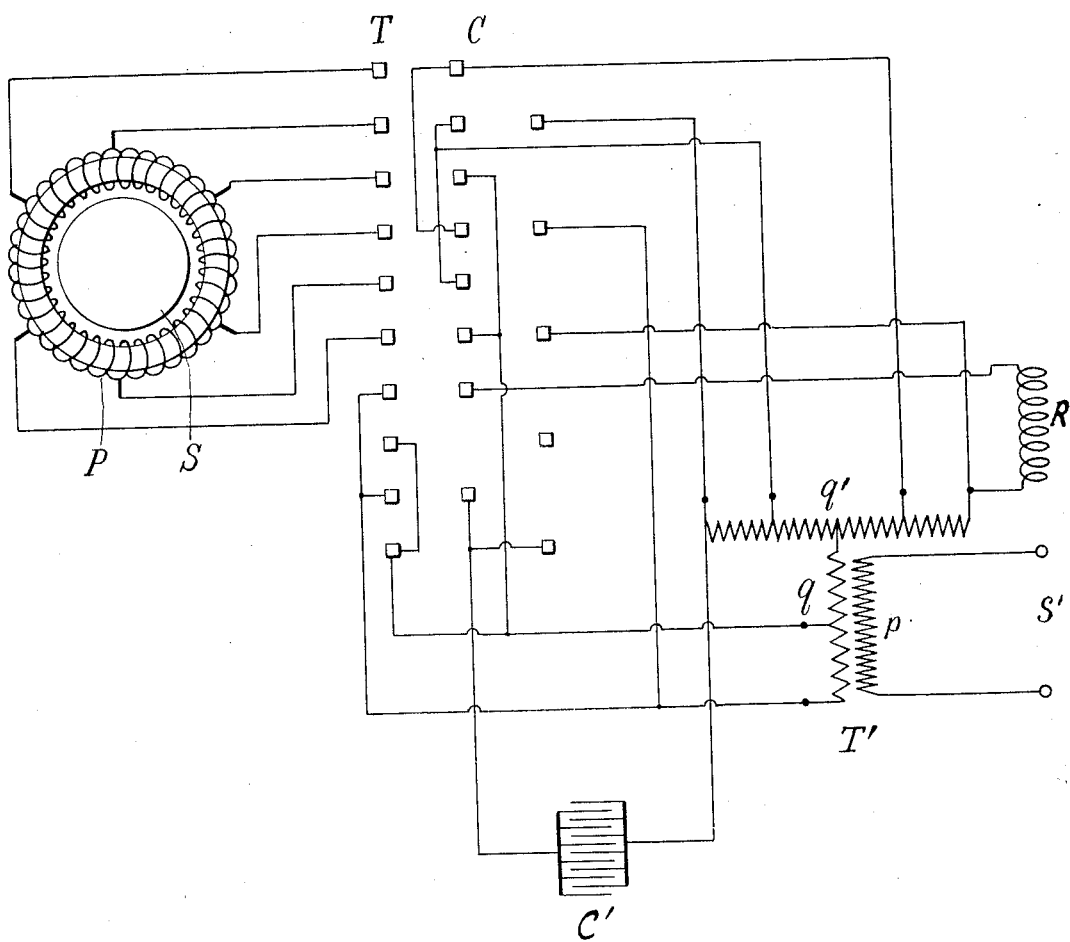

UNITED STATES PATENT OFFICE.

RALPH D. MERSHON, OF NEW YORK, N. Y.

ALTERNATING-CURRENT MACHINE ON SINGLE-PHASE CIRCUIT.

No. 852,027. Specification of Letters Patent. Patented April 30, 1907.

Application filed September 29, 1904. Serial No. 226,451.

*To all whom it may concern:*

Be it known that I, RALPH D. MERSHON, a citizen of the United States, residing at New York, in the county and State of New York, have invented certain new and useful Improvements in Alternating-Current Machines on Single-Phase Circuits, of which the following is a specification, reference being had to the drawings accompanying and forming part of the same.

My invention relates to alternating current apparatus, more particularly motors supplied with power from a single phase source, and has for its object the production of a uniformly, or approximately uniformly, rotating field, with any desired power factor.

In carrying out my invention I combine with the motor, or with the transformer from which the motor is supplied with current, devices, as a reactance and a capacity, connected thereto in such relation to the impressed electromotive force that, in the case where the devices are connected with the primary element of the motor, the motor will operate with an efficiency comparable to that of the same motor driven by polyphase currents, and that in the case where the devices are connected with the transformer, polyphase currents may be delivered to the motor.

In the first case I connect the capacity and the reactance to the primary of the motor on electrical diameters thereof and on opposite sides of the leads for the impressed electromotive force. The angle between the diameters on which these devices are connected is preferably ninety electrical degrees, and the diameter on which the impressed electromotive force is supplied is preferably midway between the two. Since one of these devices takes a lagging and the other a leading current the conditions may be made such, by properly proportioning the values of the reactance and capacity relative to each other as well as to the primary element itself, that there will result in the motor a uniformly or approximately uniformly rotating field, with practically no current taken from the supply circuit except that for the losses in the motor. In other words, the power factor will be approximately unity. It can, however, be made less than unity, and the current either leading or lagging, by the necessary proportioning of the reactance and capacity. If the former is of such character that its current preponderates, the current to the motor will lag; and if such capacity is used as to cause the condenser current to preponderate, the current to the motor will lead, as will be readily understood.

In the accompanying drawings I have shown in diagram the invention applied to motors having a single ring winding and two poles, but it will be readily seen by those skilled in the art that my invention is also applicable to machines having two or more windings, of either the ring or drum type, and also to machines having a greater number of poles. In the case of two poles, electrical and circular degrees are identical, but in applying the description to motors or generators with more than two poles it is to be noted that "degrees," wherever mentioned, are electrical.

Figure 5:
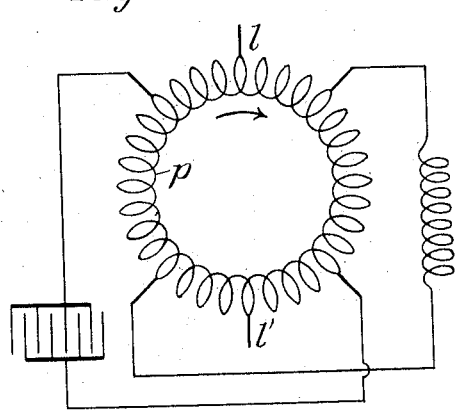
Figure 6:
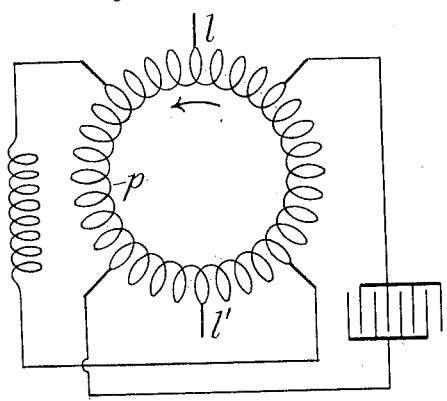

Referring now to the drawings, Figures 1, 2, 3 and 4 are diagrams showing single phase two-pole primaries, having reactances or capacities connected therewith in different ways. Figs. 5 and 6 are diagrams showing my invention applied to a two-pole motor or generator, connected with a single phase circuit. Fig. 7 illustrates diagrammatically the application of the invention to a motor, connected with a single phase source, in which the number of poles may be two or four, with means for reversing the motor by reversing the connections of the capacity and reactance relative to the impressed electromotive force. Fig. 8 is a diagram illustrating the invention with the reactance and capacity connected to the supply transformer instead of to the primary of the motor.

In Figs. 1, 2, 3, 4, 5, and 6, $p$ indicates a ring-wound primary, connected to a single phase source through leads $l\ l'$.

Referring now to Fig. 1, $r$ indicates a reactance connected to the primary element across an electrical diameter $a—b$, at some angle to the diameter $l—l'$ less than 90°. In such case it is well known that a rotating field will be produced in the primary, and that with a short circuited secondary the motor would be self-starting.

Figure 2:
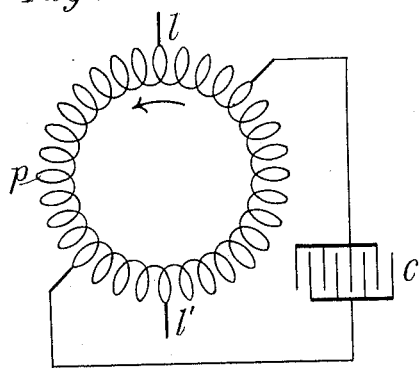

In Fig. 2 a capacity $c$ is substituted for the reactance of Fig. 1, resulting also in the production of a rotating field, but in the opposite direction.

Figure 3:
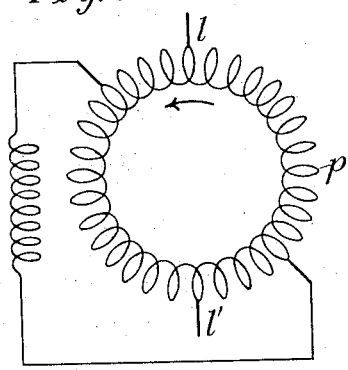
Figure 4:
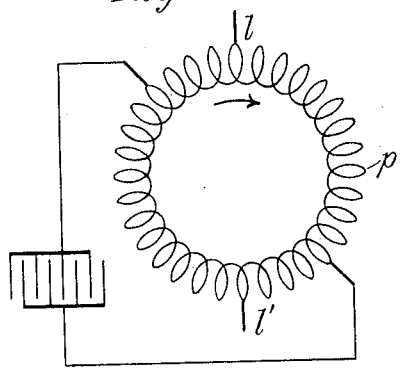

In Figs. 3 and 4 the reactance and the capacity are connected to the primary on the other side of the diameter $l—l'$, producing rotating fields which are opposite in direction to those of Figs. 1 and 2 respectively.

So far as the direction of the rotating fields is concerned it is therefore not impossible to combine Fig. 1 with Fig. 4, and Fig. 2 with Fig. 3, but so far as I am aware such combination has not heretofore been made, and I therefore employ that combination, for various reasons. For example, it makes the operation of a motor on a single phase circuit comparable in efficiency to that of a polyphase motor. The principle may also be applied with advantage to generators. My invention therefore consists, in its simplest form, in combining the effects typified in Figs. 1, 2, 3, and 4, in a motor or generator connected with a single phase circuit. In this simple form the invention is illustrated in Figs. 5 and 6, in the former of which Figs. 1 and 4 have been combined, and in the latter Figs. 2 and 3. The angle existing in these figures between the diameters on which the reactances and capacities are connected, is shown as 90°, which is in general the best for starting effect, but it may be any other angle, if desired. It is also in general preferable to have the leads for the impressed electromotive force located midway between the connections of the reactance and capacity, as shown, whatever the angle between these connections, but they may be located to one side or the other of the middle point if found desirable.

The effects of the reactance and capacity, both at starting and when running, are of course different as to the kind of current taken by them. The former takes a current of the same nature as that ordinarily taken from the supply source by the motor, namely a lagging current, and the reactance will therefore cause the lagging current to the motor to be increased. With the condenser alone, or with a reactance and condenser, by properly proportioning the condenser, the motor may be made to take from the supply source a current of approximately unity power factor, or even leading if desired.

Referring again to Figs. 5 and 6, the distribution of current therein may be briefly stated as follows. By reason of the rotating field, the E. M. F's. impressed upon the reactance and capacity are approximately 90° apart. Since one of these devices takes a lagging and the other a leading current, the conditions, as previously mentioned, may be made such, by properly proportioning the values of the two devices, that the rotating field in the motor will be uniform, or approximately uniform, with practically no current taken from the supply circuit at the points $l$, $l'$, except that for the losses in the motor. That is to say, the power factor will be approximately unity, though it may be made less than unity, and the current either leading or lagging, by the necessary variation in the values of the capacity and reactance. With a condenser of such capacity that its current preponderates, the current to the motor will lead; while with a preponderating reactance current, that to the motor will lag. Since in this arrangement, (Figs. 5 and 6,) the E. M. F's. impressed upon the reactance and capacity respectively are in quadrature or approximately so, and since one takes a current practically 90° lagging and the other a current practically 90° leading, there will always exist between the two circuits a relation which is substantially symmetrical and such as to result in the production of a uniform or approximately uniform rotating field. This important advantage of my invention is not found in the previous arrangements, in which, in a three phase system, for example a reactance is connected across one circuit, the capacity across another, and the impressed electromotive force across the third.

It is clear that the invention is not limited to any particular number of poles, and may therefore be applied to machines in which the number of poles may be varied, as for the purpose of varying the speed. In Fig. 7 I have shown my invention applied to a motor adapted to run with two and with four poles. The primary element of the motor is indicated by P, and the secondary by S, the former having leads brought out to terminals T. S' is a source of single phase current, and C is a diagrammatic controller, to which is connected also a reactance R and a condenser C', the latter being connected inductively by means of the transformer $t$, as shown. By tracing out the connections it will be seen that the positions of the leads between the motor and the capacity and reactance, relative to the leads for the impressed electromotive force, are the same in both steps of the controller. It will also be seen, in Fig. 7, that in changing from one number of poles to the other the current taken by the reactance and by the capacity is varied to values desirable for the connection corresponding to the new number of poles. This is effected, in the case of the condenser, by causing to be impressed upon it a higher or lower voltage, as the case may be, than that which would be impressed thereon if the condenser were connected directly to the motor winding. This is done by changing the ratio of the transformer $t$. With the reactance, the desired result is secured by varying the number of turns. It is evident that both reactance and condenser might be fed by intermediate transformers, similar to $t$, and the current to these devices respectively varied by changing the ratios of the transformers. Or, the condenser current might be varied by increasing or diminishing its capacity, or by switching condensers into series and into multiple. The reactance current might be varied in a corresponding way, instead of by the methods before outlined therefor. The precise way in which the currents to these elements are varied is of course immaterial and is rather a matter of convenience or desirability under particular circumstances. But the principle of regulating the current taken by these devices, or by one of them if only one is used, for each change in the connections of the motor, to suit such particular connections and the conditions under which the motor is running, I consider novel, and I claim the same broadly in my co-pending application Serial No. 230,663.

The motor may be reversed by interchanging the positions of the reactance and capacity, or where only one such device is used, by switching it to the other side of the diameter of the impressed electromotive force. In Fig. 7, D indicates a double-throw switch, so connected with the reactance and capacity that, as will be seen by tracing the connections, these devices may be readily interchanged.

Instead of connecting the reactance and capacity to the primary of the motor, as in the preceding examples, they may be connected to the transforming apparatus from which the machine derives its current. This plan also may be used with any number of poles, and in Fig. 8 I have shown diagrammatically a system in which the motor, deriving its power from a single phase source as in the previously mentioned cases, may be operated with two and four poles. In this figure the various elements of the system are indicated by the same reference characters as in Fig. 7. The transforming apparatus, designated by T', has principal and quadrature secondary windings $q, q'$. To these are connected the reactance R and the condenser C', in the manner shown. The winding $q'$ may have an open or a closed magnetic circuit, as desired, but the open circuit prevents saturation and will therefore usually be preferable. In this case, as in the preceding example, the currents to the reactance and capacity are regulated at each step of the controller to suit the particular connections thus made in the motor. It is to be noted, in connection with Fig. 8, that polyphase currents are taken from the supply transforming apparatus and supplied to the motor. The currents so derived may of course be two phase, three phase, or any number of phases desired.

Having now described my invention, what I claim is:

1. The combination with the primary element of an alternating current machine, of a reactance and a capacity connected to the primary element, and connections from the primary element to a single phase circuit, said circuit connections being intermediate to the connections of the reactance and capacity, as set forth.

2. The combination with the primary element of an alternating current machine, of a reactance and a capacity connected to the primary element on electrical diameters substantially 90 electrical degrees apart, and connections from the primary element to a single phase circuit, said circuit connections being intermediate to the connections of the reactance and capacity, as set forth.

3. The combination with the primary element of an alternating current machine, of a reactance and a capacity connected to the primary element, and connections from the primary element to a single phase circuit, said circuit connections being midway between the connections of the reactance and capacity, as set forth.

4. The combination with the primary element of an alternating current machine, of a reactance and a capacity connected to the primary element on electrical diameters substantially 90 electrical degrees apart, and connections from the primary element to a single phase circuit, said circuit connections being midway between the connections of the reactance and capacity, as set forth.

5. The combination with the primary element of an alternating current machine, connections therefrom to a single phase circuit, and means for varying the number of poles, of a reactance and a capacity connected to the primary element, said circuit connections being intermediate to the connections of the reactance and capacity, and means for shifting the connections of the reactance and capacity to maintain the relation thereof to the said circuit connections for the different numbers of poles, as set forth.

6. The combination with the primary element of an alternating current machine, connections therefrom to a single phase circuit, and means for varying the number of poles, of a reactance and a capacity connected to the primary element on electrical diameters substantially 90 electrical degrees apart, said circuit connections being intermediate to the connections of the reactance and capacity, and means for shifting the connections of the reactance and capacity to maintain the relation thereof to the said circuit connections for the different numbers of poles, as set forth.

7. The combination with the primary element of an alternating current machine, connections therefrom to a single phase circuit, and means for varying the number of poles, of a reactance and a capacity connected to the primary element, said circuit connections being midway between the connections of the reactance and capacity, and means for shifting the connections of the reactance and capacity to maintain the relation thereof to the said circuit connections for the different numbers of poles, as set forth.

8. The combination with the primary element of an alternating current machine, connections therefrom to a single phase circuit, and means for varying the number of poles, of a reactance and a capacity connected to the primary element on electrical diameters substantially 90 electrical degrees apart, said circuit connections being midway between the connections of the reactance and capacity, and means for shifting the connections of the reactance and capacity to maintain the relation thereof to the said circuit connections for the different numbers of poles, as set forth.

9. The combination with the primary element of an alternating current machine, and means for varying the number of poles, of a reactance and a capacity connected to the primary element, connections from the primary element to a single phase circuit, said connections being intermediate to the connections of the reactance and capacity, means for shifting the connections of the reactance and capacity to maintain the relation thereof to the said circuit connections for the different numbers of poles, and means for regulating the current taken by the reactance and the capacity, as set forth.

10. The combination with the primary element of an alternating current machine, connections therefrom to a single phase circuit, and means for varying the number of poles, of a reactance and a capacity connected to the primary element on electrical diameters substantially 90 electrical degrees apart, said circuit connections being intermediate to the connections of the reactance and capacity, means for shifting the connections of the reactance and capacity to maintain the relation thereof to the said circuit connections for the different numbers of poles, and means for regulating the current taken by the reactance and the capacity, as set forth.

11. The combination with the primary element of an alternating current machine, connections therefrom to a single phase circuit, and means for varying the number of poles, of a reactance and a capacity connected to the primary element, said circuit connections being midway between the connections of the reactance and capacity, means for shifting the connections of the reactance and the capacity to maintain the relation thereof to the said circuit connections for the different numbers of poles, and means for regulating the current taken by the reactance and the capacity, as set forth.

12. The combination with the primary element of an alternating current machine, connections therefrom to a single phase circuit, and means for varying the number of poles, of a reactance and a capacity connected to the primary element on electrical diameters substantially 90 electrical degrees apart, said circuit connections being midway between the connections of the reactance and the capacity, means for shifting the connections of the reactance and capacity to maintain the relation thereof to the said circuit connections for the different numbers of poles, and means for regulating the current taken by the reactance and the capacity, as set forth.

13. The combination with the primary element of an alternating current machine, connections therefrom to a single phase circuit, and means for varying the number of poles, of a capacity connected to the primary element across one or more common electrical diameters for one number of poles, and means for shifting the connections of the capacity to maintain the relation thereof to the circuit connection for other numbers of poles, as set forth.

14. The combination with the primary element of an alternating current machine, connections therefrom to a single phase circuit, and means for varying the number of poles, of a capacity connected to the primary element across one or more common electrical diameters substantially 45 electrical degrees from the circuit connections for one number of poles, and means for shifting the connections of the capacity to maintain the relation thereof to the circuit connections for other numbers of poles, as set forth.

15. The combination with the primary element of an alternating current motor, of a reactance and a capacity connected to the primary element, connections from the primary element to a single phase circuit, the said circuit connections being intermediate to the connections of the reactance and capacity, and means for interchanging the connections of the reactance and capacity to reverse the motor, as set forth.

RALPH D. MERSHON.

Witnesses:
S. S. DUNHAM,
M. LAWSON DYER.